(12) United States Patent
Rahe

(10) Patent No.: US 11,622,498 B2
(45) Date of Patent: Apr. 11, 2023

(54) METHOD OF SPREADING GRANULAR MATERIAL

(71) Applicant: Amazonen-Werke H. Dreyer GmbH & Co. KG, Hasbergen (DE)

(72) Inventor: Florian Rahe, Lotte (DE)

(73) Assignee: AMAZONEN-WERKE H. DREYER SE & CO. KG

( * ) Notice: Subject to any disclaimer, the term of this patent is extended or adjusted under 35 U.S.C. 154(b) by 477 days.

(21) Appl. No.: 16/645,905

(22) PCT Filed: Aug. 29, 2018

(86) PCT No.: PCT/EP2018/073179
§ 371 (c)(1),
(2) Date: Mar. 10, 2020

(87) PCT Pub. No.: WO2019/048297
PCT Pub. Date: Mar. 14, 2019

(65) Prior Publication Data
US 2020/0275603 A1    Sep. 3, 2020

(30) Foreign Application Priority Data
Sep. 11, 2017 (DE) .......................... 102017120870.4

(51) Int. Cl.
*A01C 17/00* (2006.01)

(52) U.S. Cl.
CPC .................. *A01C 17/008* (2013.01)

(58) Field of Classification Search
CPC ...... A01C 17/008; A01C 17/006; A01C 17/00
See application file for complete search history.

(56) References Cited

U.S. PATENT DOCUMENTS 9,649,646 B1    5/2017 Podoil et al.

FOREIGN PATENT DOCUMENTS

| EP | 2 409 559 A1 | 1/2012 |
|---|---|---|
| EP | 2 689 649 A1 | 1/2014 |

OTHER PUBLICATIONS

International Search Report dated Nov. 26, 2018 in corresponding PCT Patent Application No. PCT/EP2018/073179.

*Primary Examiner* — Christopher J. Novosad
(74) *Attorney, Agent, or Firm* — Mintz, Levin, Cohn, Ferris, Glovsky and Popeo, P.C.

(57) ABSTRACT

A method of spreading granular material by a spreader utilizes first and second rotatingly drivable centrifugal disks arranged side by side, and includes steps of: detecting a field-internal spreading boundary, which extends ahead of the spreader in a direction of movement of the spreader and which necessitates an adaptation of distribution characteristics of the spreader during traveling on at least one tramline; reducing an amount of granular material applied to the second centrifugal disk, which is part of the spreader and which faces the field-internal spreading boundary, during traveling through a first range close to the field-internal spreading boundary; and increasing the amount of granular material applied to the first centrifugal disk, which is part of the spreader and which faces away from the field-internal spreading boundary, during traveling through the first range close to the field-internal spreading boundary.

12 Claims, 5 Drawing Sheets

METHOD OF SPREADING GRANULAR MATERIAL

Figure 1:
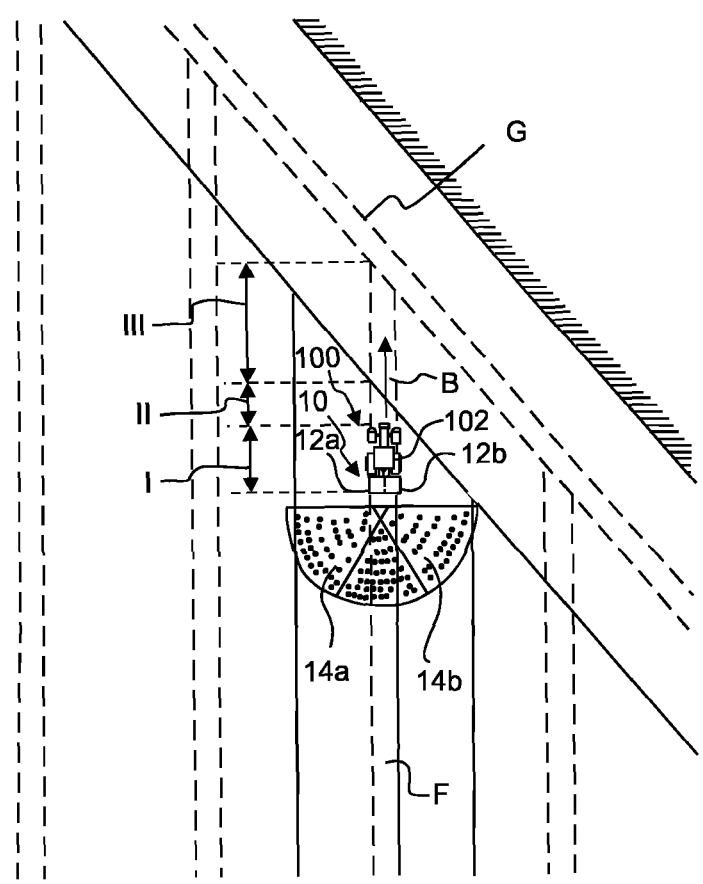

The present invention relates to a method of spreading granular material/spreading material according to the preamble of claim 1, a spreader for distributing granular material according to the preamble of claim 10 and a spreading combination according to the preamble of claim 11.

When granular materials, such as fertilizers, are applied to crop plants, it is always aimed at to distribute the granular material as evenly as possible. In the inner area of a field an even distribution of the granular material is achieved e.g. in that the amount of granular material spread initially decreases with increasing distance from a tramline used for spreading, so that a triangular distribution extending outwards from the tramline will be obtained on each side of the tramline. Through a further spreading operation, in which the spreader is moved along a neighboring tramline, the amount of granular material spread will again decrease with increasing distance from the tramline, so that an even distribution of the granular material will be obtained in the overlapping area of two neighboring tramlines.

Separate spreading takes place in the area of the headland and at the field edge, respectively, since special legal requirements, which necessitate special spreading characteristics, have to be complied with here.

Since the geometry of fields is rectangular only in rare cases, wedge-shaped areas are often formed in the edge area, which make it necessary to adapt the spreading of the granular material to oblique, field-internal spreading boundaries. In order to avoid incorrect spreading in these cases, the spreading of the granular material should be adapted as precisely as possible to the wedge shape of the field. In this respect, it is common practice to adjust the speed of the centrifugal disks, the point where the granular material is applied to the centrifugal disks, the amount of material to be spread, the discharge angle and/or the throwing distance accordingly.

Reference EP 2 689 649 A1, for example, discloses a fertilizer spreader, in the case of which the dosing unit assigned to the centrifugal disk facing the field-internal spreading boundary is switched off in a range close to the field-internal spreading boundary, the amount of granular material applied to the centrifugal disk that faces away from the field-internal spreading boundary being simultaneously increased. By adjusting the parameters of the spreader, it is achieved that, in the range close to the field-internal spreading boundary, the spreading of the granular material is performed exclusively by the centrifugal disk facing away from the field-internal spreading boundary.

The publications EP 2 417 848 A2 and EP 2 409 559 B1 disclose further solution approaches, which are intended to lead to an increase in the uniformity of spreading granular material in wedge-shaped field areas.

However, the known solutions do not lead to a satisfactory distribution of the granular material in the area of oblique field-internal spreading boundaries, or they necessitate a time-consuming spreading process.

Hence, the task underlying the present invention is to increase the uniformity with which granular material is spread in the area of oblique field-internal spreading boundaries, without significantly increasing the spreading time required.

The task is solved by a method of the type referred to at the beginning, in the case of which the amount of granular material applied to the centrifugal disk, which is part of the spreader and which faces away from the field-internal spreading boundary, is increased during traveling through a first range close to the field-internal spreading boundary.

The present invention makes use of the finding that, when the reduction of the amount of granular material applied to the centrifugal disk, which is part of the spreader and which faces the field-internal spreading boundary, and the increase in the amount of granular material applied to the centrifugal disk, which is part of the spreader and which faces away from the field-internal spreading boundary, are adapted to one another, this will lead to a significant increase in the uniformity of the spreading material distribution in the area of the field-internal spreading boundary. Reducing the amount of granular material applied to the centrifugal disk, which is part of the spreader and which faces the field-internal spreading boundary, does not comprise a deactivation of the dosing unit, whereby no further granular material would be applied to the centrifugal disk, which is part of the spreader and which faces the field-internal spreading boundary.

The first range close to the field-internal spreading boundary extends preferably from a first distance between the spreader and the field-internal spreading boundary up to a second distance between the spreader and the field-internal spreading boundary. The field-internal spreading boundary may here be straight or curved. The reduction of the amount of granular material applied to the centrifugal disk, which is part of the spreader and which faces the field-internal spreading boundary, is preferably carried out continuously or in a plurality of steps, the reduction taking place during traveling through the first range close to the field-internal spreading boundary. The increase in the amount of granular material applied to the centrifugal disk, which is part of the spreader and which faces away from the field-internal spreading boundary, is preferably carried out continuously or in a plurality of steps, the increase taking place during traveling through the first range close to the field-internal spreading boundary. The application point of the granular material applied to the centrifugal disk, which is part of the spreader and which faces away from the field-internal spreading boundary, remains preferably unchanged during traveling through the first close range. The application point of the granular material applied to the centrifugal disk, which is part of the spreader and which faces the field-internal spreading boundary, remains preferably unchanged during traveling through the first close range.

According to a further preferred embodiment of the method according to the present invention, the rotational speed of the centrifugal disk, which is part of the spreader and which faces the field-internal spreading boundary, is reduced during traveling through the first range close to the field-internal spreading boundary. Alternatively or additionally, the rotational speed of the centrifugal disk, which is part of the spreader and which faces away from the field-internal spreading boundary, is reduced during traveling through the first range close to the field-internal spreading boundary. The rotational speed of the centrifugal disk, which is part of the spreader and which faces the field-internal spreading boundary, is initially reduced more strongly than the rotational speed of the centrifugal disk, which is part of the spreader and which faces away from the field-internal spreading boundary. When leaving the first range close to the field-internal spreading boundary, the centrifugal disk, which is part of the spreader and which faces the field-internal spreading boundary, and the centrifugal disk, which is part of the spreader and which faces away from the field-internal spreading boundary, preferably have substantially identical speeds of rotation.

According to a preferred further development of the method disclosed by the present invention, the amount of granular material applied to the centrifugal disk, which is part of the spreader and which faces the field-internal spreading boundary, is reduced during traveling through a second range close to the field-internal spreading boundary, the second range adjoining the first range close to the field-internal spreading boundary. Preferably, the amount of granular material applied to the centrifugal disk, which is part of the spreader and which faces the field-internal spreading boundary, is reduced to zero during traveling through the second range close to the field-internal spreading boundary. The second range close to the field-internal spreading boundary extends preferably from the second distance between the spreader and the field-internal spreading boundary up to a third distance between the spreader and the field-internal spreading boundary. The reduction of the amount of granular material applied to the centrifugal disk, which is part of the spreader and which faces the field-internal spreading boundary, is preferably carried out continuously or in a plurality of steps, the reduction taking place during traveling through the second range close to the field-internal spreading boundary.

In addition, a method according to the present invention is preferred, in which the amount of granular material applied to the centrifugal disk, which is part of the spreader and which faces away from the field-internal spreading boundary, is reduced during traveling through a second range close to the field-internal spreading boundary, the second range adjoining the first range close to the field-internal spreading boundary. Preferably, the percentage by which the amount of granular material applied to the centrifugal disk, which is part of the spreader and which faces away from the field-internal spreading boundary, during traveling through the second range close to the field-internal spreading boundary, is reduced corresponds preferably to the percentage by which the amount of granular material that has been applied to the centrifugal disk, which is part of the spreader and which faces away from the field-internal spreading boundary, during traveling through the first range close to the field-internal spreading boundary, has been increased. The reduction of the amount of granular material applied to the centrifugal disk, which is part of the spreader and which faces away from the field-internal spreading boundary, is preferably carried out continuously or in a plurality of steps, the reduction taking place during traveling through the second range close to the field-internal spreading boundary.

In another embodiment of the method according to the present invention the total amount of granular material applied to the centrifugal disk, which is part of the spreader and which faces away from the field-internal spreading boundary, and to the centrifugal disk, which is part of the spreader and which faces the field-internal spreading boundary, while traveling through the first close range and the second close range, corresponds to the usual total amount of granular material for this area. The value used as a reference value for the usual total amount of granular material for an area may, for example, be the inner area of a field in which, due to non-existing field-internal spreading boundaries, it is not necessary to adapt the distribution characteristics of the spreader in a suitable manner. Since the method according to the present invention guarantees a high spreading uniformity also in wedge-shaped field areas, there is no need to deviate from the usual spreading quantity for this area.

In addition, a method according to the present invention is preferred, in the case of which the further amount of granular material additionally applied to the centrifugal disk, which is part of the spreader and which faces away from the field-internal spreading boundary, during traveling through the first close range and the second close range, corresponds to the reduction amount of granular material applied less to the centrifugal disk, which is part of the spreader and which faces the field-internal spreading boundary, during traveling through the first close range and the second close range. The further amount of granular material preferably corresponds to the difference in quantity between the amount of granular material actually applied to the centrifugal disk, which is part of the spreader and which faces away from the field-internal spreading boundary, during traveling through the first close range and the second close range, and a theoretical amount of granular material that would have been applied to the centrifugal disk, which is part of the spreader and which faces away from the field-internal spreading boundary, if the amount of granular material applied to the centrifugal disk, which is part of the spreader and which faces away from the field-internal spreading boundary, had neither been increased in the first close range nor reduced in the second close range, but had been kept constant during traveling through the first close range and the second close range. The reduction amount of granular material corresponds preferably to the difference in quantity between the granular material actually applied to the centrifugal disk, which is part of the spreader and which faces the field-internal spreading boundary, during traveling through the first close range and the second close range, and a theoretical amount of granular material that would have been applied to the centrifugal disk, which is part of the spreader and which faces the field-internal spreading boundary, if the amount of granular material applied to the centrifugal disk, which is part of the spreader and which faces the field-internal spreading boundary, had been continuously and uniformly reduced to zero during traveling through the first close range and the second close range.

The method according to the present invention preferably comprises increasing the rotational speed of the centrifugal disk, which is part of the spreader and which faces the field-internal spreading boundary, during traveling through the second range close to the field-internal spreading boundary. Preferably, the percentage by which the rotational speed of the centrifugal disk, which is part of the spreader and which faces the field-internal spreading boundary, is increased, during traveling through the second range close to the field-internal spreading boundary, corresponds to the percentage by which the rotational speed of the centrifugal disk, which is part of the spreader and which faces the field-internal spreading boundary, has been reduced, during traveling through the first range close to the field-internal spreading boundary. Since the amount of granular material applied to the centrifugal disk facing the field-internal spreading boundary is very small during traveling through the second close range, the speed of the centrifugal disk facing the field-internal spreading boundary is of secondary importance. For this reason, the speed of the centrifugal disk facing the field-internal spreading boundary can be re-increased to a standard speed, during traveling through the second close range or after the second close range has been left, so that a suitable speed will be available when the dosing unit is opened again. Preferably, all standard spreading settings, with which the spreader is operated in the inner area of the field, are set automatically as soon as the amount of spreading material applied to a centrifugal disk has decreased to zero.

The application point of the granular material applied to the centrifugal disk, which is part of the spreader and which faces away from the field-internal spreading boundary, remains preferably unchanged during traveling through the second close range. The application point of the granular material applied to the centrifugal disk, which is part of the spreader and which faces the field-internal spreading boundary, remains preferably unchanged during traveling through the second close range.

In another embodiment of the method according to the present invention, the amount of granular material applied to the centrifugal disk, which is part of the spreader and which faces away from the field-internal spreading boundary, is reduced during traveling through a third range close to the field-internal spreading boundary, the third range adjoining the second range close to the field-internal spreading boundary. Preferably, the amount of granular material applied to the centrifugal disk, which is part of the spreader and which faces the field-internal spreading boundary, is reduced to zero during traveling through the third range close to the field-internal spreading boundary. The third range close to the field-internal spreading boundary extends from the third distance between the spreader and the field-internal spreading boundary up to the field-internal spreading boundary itself or up to a fourth distance between the spreader and the field-internal spreading boundary. The reduction of the amount of granular material applied to the centrifugal disk, which is part of the spreader and which faces away from the field-internal spreading boundary, is preferably carried out continuously or in a plurality of steps, the reduction taking place during traveling through the third range close to the field-internal spreading boundary. During traveling through the third range close to the field-internal spreading boundary, the centrifugal disk, which is part of the spreader and which faces the field-internal spreading boundary, has preferably no granular material applied thereto.

According to a further development of the method disclosed by the present invention, the application point of the granular material applied to the centrifugal disk, which is part of the spreader and which faces away from the field-internal spreading boundary, is changed during traveling through the third range close to the field-internal spreading boundary. The application point of the granular material applied to the centrifugal disk, which is part of the spreader and which faces away from the field-internal spreading boundary, can be changed, during traveling through the third range close to the field-internal spreading boundary, e.g. in a radial direction, in a direction of rotation and/or in a direction opposite to the direction of rotation of the centrifugal disk facing away from the field-internal spreading boundary. The application point of the granular material applied to the centrifugal disk, which is part of the spreader and which faces the field-internal spreading boundary, remains essentially unchanged during traveling through the third range close to the field-internal spreading boundary.

In addition, a method according to the present invention is preferred, in which changing the application point of the granular material applied to the centrifugal disk, which is part of the spreader and which faces away from the field-internal spreading boundary, comprises changing the relative position and/or the relative orientation of the centrifugal disk facing away from the field-internal spreading boundary and of a dosing unit assigned to the centrifugal disk facing away from the field-internal spreading boundary. Alternatively or additionally, the changing of the application point of the granular material applied to the centrifugal disk, which is part of the spreader and which faces away from the field-internal spreading boundary, comprises moving the centrifugal disk facing away from the field-internal spreading boundary and/or moving a dosing unit assigned to the centrifugal disk facing away from the field-internal spreading boundary.

Furthermore, a method according to the present invention is advantageous, in which the changing of the application point of the granular material applied to the centrifugal disk, which is part of the spreader and which faces away from the field-internal spreading boundary, takes place such that the spreading pattern of the centrifugal disk facing away from the field-internal spreading boundary is turned away from the spreading boundary.

Moreover, a method according to the present invention is preferred, in which the rotational speed of the centrifugal disk, which is part of the spreader and which faces away from the field-internal spreading boundary, is increased during traveling through the third range close to the field-internal spreading boundary. Preferably, the percentage by which the rotational speed of the centrifugal disk, which is part of the spreader and which faces away from the field-internal spreading boundary, is increased, during traveling through the third range close to the field-internal spreading boundary, corresponds to the percentage by which the rotational speed of the centrifugal disk, which is part of the spreader and which faces away from the field-internal spreading boundary, is reduced, during traveling through the first range close to the field-internal spreading boundary.

The task underlying the present invention is also solved by a spreader of the type referred to at the beginning, the spreader being configured to execute the method for spreading granular material according to one of the above described embodiments. As regards the advantages and the modifications of the spreader according to the present invention, reference is made to the advantages and the modifications of the method according to the present invention.

The task underlying the present invention is also solved by a spreading combination of the type referred to at the beginning, the spreading combination according to the present invention being configured to execute the method for spreading granular material according to one of the above described embodiments. As regards the advantages and the modifications of the spreading combination according to the present invention, reference is made to the advantages and the modifications of the method according to the present invention.

Further details of the invention can be seen from the description of the figures and from the drawings, in which FIG. 1 shows, in a schematic representation, an embodiment of a spreading combination according to the present invention, executing the method according to the present invention;

FIG. 2 shows, in a schematic representation, the spreading combination shown in FIG. 1, executing the method according to the present invention;

FIG. 3 shows, in a schematic representation, the spreading combination shown in FIG. 1, executing the method according to the present invention;

FIG. 4 shows, in a schematic representation, the spreading combination shown in FIG. 1, executing the method according to the present invention; and FIG. 5 shows, in a schematic diagram, the change of the spreading parameters during execution of the method according to the present invention.

FIG. 1 to FIG. 4 show a spreading combination 100 with a spreader 10 configured as a centrifugal fertilizer spreader for spreading granular material/spreading material and a vehicle 102 carrying the spreader 10 and configured as a tractor.

The spreading device 10 comprises two rotatingly drivable centrifugal disks 12a, 12b arranged side by side. The spreading combination 100 moves in a direction of movement B towards a field-internal spreading boundary G extending at an oblique angle to the current tramline F of the spreading combination 100, the field-internal spreading boundary G representing a boundary tramline. Due to the fact that the field-internal spreading boundary G extends at an oblique angle to the tramline F, it will be necessary to adapt the distribution characteristics of the spreader 10 during traveling through the close ranges I, II, III in the tramline F.

The centrifugal disk 12a is arranged on a side facing away from the field-internal spreading boundary G, the spreading material discharge of the centrifugal disk 12a exhibiting the spreading pattern 14a. The centrifugal disk 12b is arranged on a side facing the field-internal spreading boundary G, the spreading material discharge of the centrifugal disk 12b exhibiting the spreading pattern 14b.

Before or during the spreading process, the field-internal spreading boundary G extending, in a direction of movement B of the spreader 10, ahead of the spreader 10 is first detected.

Figure 5:
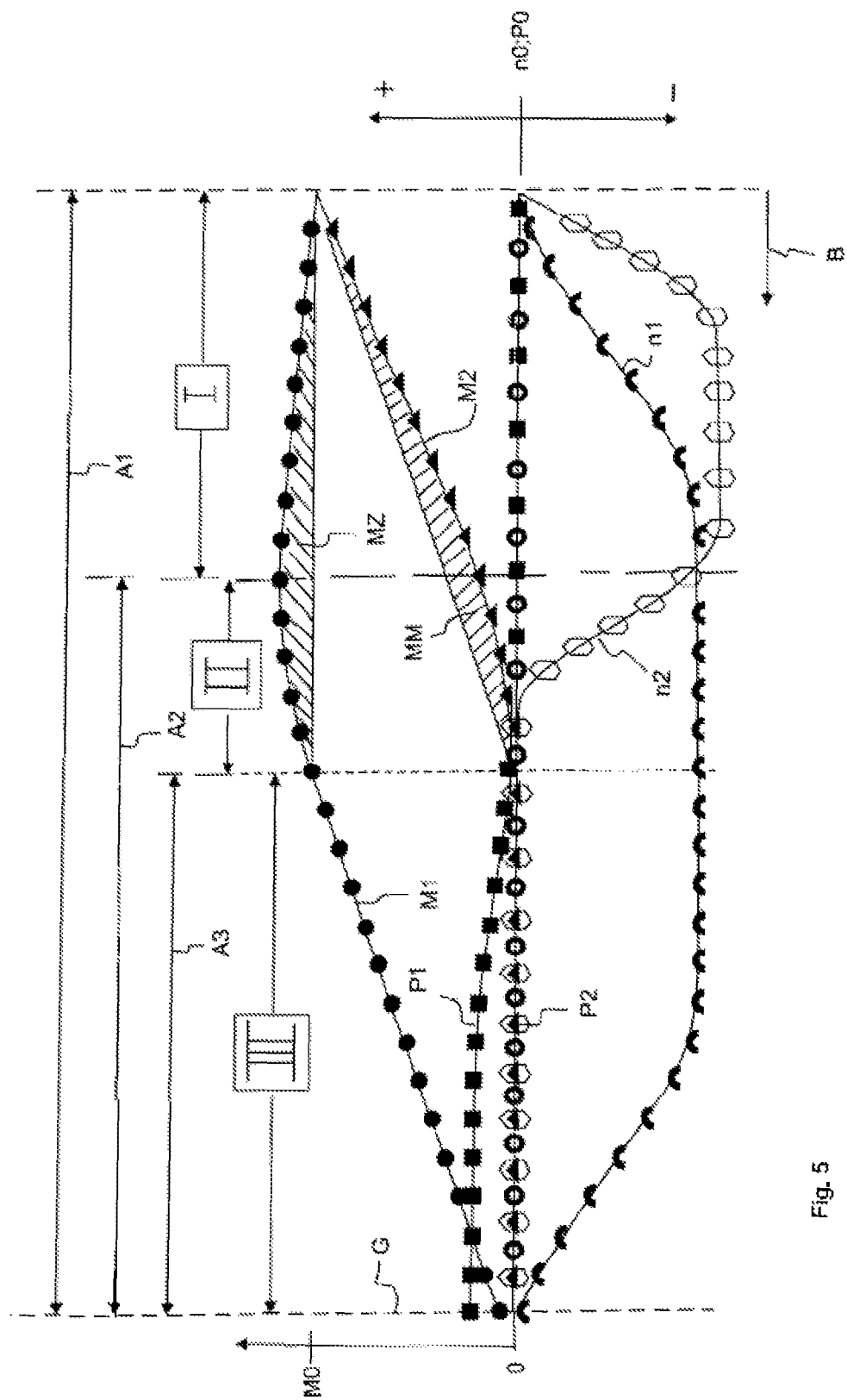

In FIG. 1, the spreader 10 is located directly in front of a first close range I. In combination with FIG. 5, it can be seen that, during traveling through the first close range, the amount M2 of granular material applied to the centrifugal disk 12b, which is part of the spreader 10 and which faces the field-internal spreading boundary G, is reduced starting from a normal amount M0. Simultaneously, the amount M1 of spreading material applied to the centrifugal disk 12a, which is part of the spreader 10 and which faces away from the field-internal spreading boundary G, is increased, starting from a normal amount M0, during traveling through the first close range I. The first range I close to the field-internal spreading boundary G extends from a first distance A1 between the spreader 10 and the field-internal spreading boundary G up to a second distance A2 between the spreader 10 and the field-internal spreading boundary G.

The application point P1 of the granular material applied to the centrifugal disk 12a, which is part of the spreader 10 and which faces away from the field-internal spreading boundary G, and the application point P2 of the granular material applied to the centrifugal disk 12b, which is part of the spreader 10 and which faces the field-internal spreading boundary G, remain unchanged during traveling through the first close range I, so that the application point P0, which is set during normal operation of the spreader 10 while granular material is being spread in the interior part of the field, is maintained in the first close range I. In addition, the rotational speeds n1, n2 of both centrifugal disks 12a, 12b of the spreader 10 are reduced, starting from a normal speed n0, during traveling through the first range I close to the field-internal spreading boundary G, the centrifugal disks 12a, 12b having identical rotational speeds when leaving the first range I close to the field-internal spreading boundary G.

Figure 2:
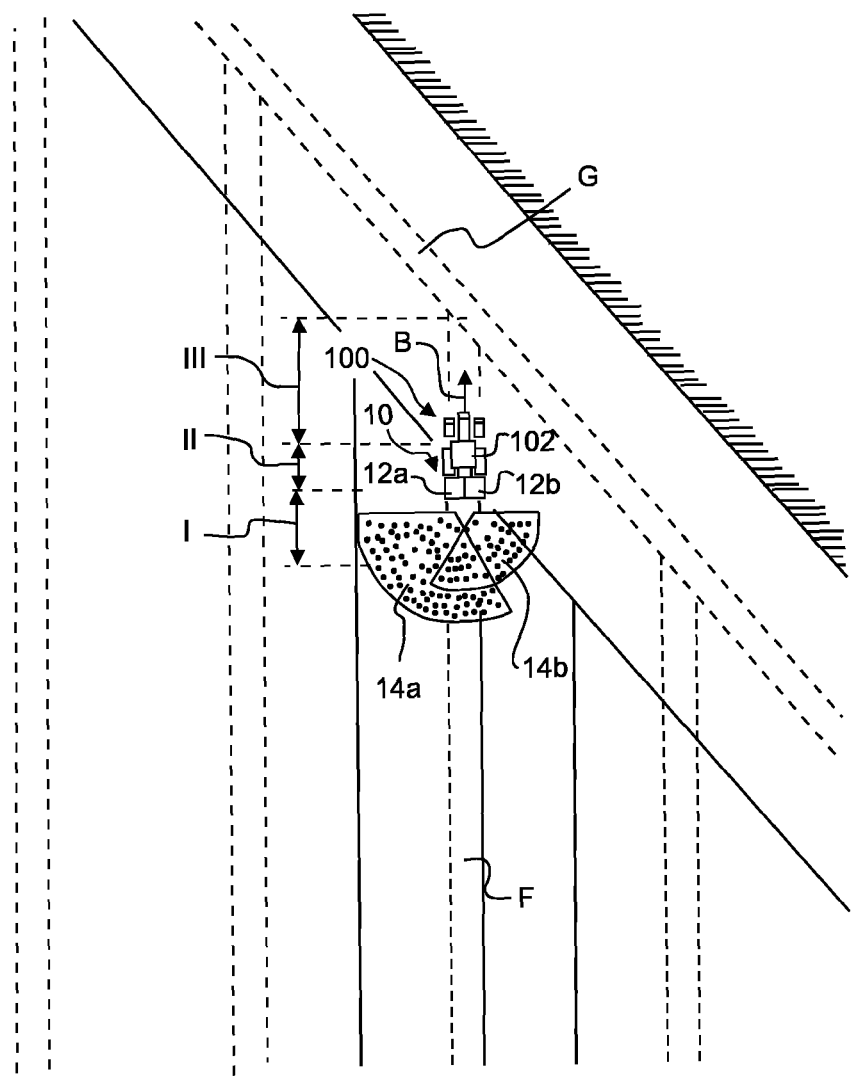

In FIG. 2, the spreading device 10 is located directly in front of a second close range II, which adjoins the first range I close to the field-internal spreading boundary G. In conjunction with FIG. 5, it can be seen that the amount M2 of granular material applied to the centrifugal disk 12b, which is part of the spreader 10 and which faces the field-internal spreading boundary G, is reduced to zero during traveling through the second range II close to the field-internal spreading boundary G. Simultaneously, the amount M1 of spreading material applied to the centrifugal disk 12a, which is part of the spreader 10 and which faces away from the field-internal spreading boundary G, is reduced during traveling through a second range II close to the field-internal spreading boundary G. The percentage by which the amount M1 of granular material applied to the centrifugal disk 12a, which is part of the spreader 10 and which faces away from the field-internal spreading boundary G, during traveling through the second range II close to the field-internal spreading boundary G, is reduced corresponds to the percentage by which the amount M1 of granular material that has been applied to the centrifugal disk 12a, which is part of the spreader 10 and which faces away from the field-internal spreading boundary G, during traveling through the first range I close to the field-internal spreading boundary G, has been increased, so that the amount M1 of granular material applied to the centrifugal disk 12a, which is part of the spreader 10 and which faces away from the field-internal spreading boundary G, will again correspond to the normal amount M0 when the second close range II is left.

The total amount of granular material applied to the centrifugal disk 12a, which is part of the spreader 10 and which faces away from the field-internal spreading boundary G, and to the centrifugal disk 12b, which is part of the spreader 10 and which faces the field-internal spreading boundary G, while traveling through the first close range I and the second close range II, corresponds to the usual total amount of granular material for this area. The further amount of granular material MZ additionally applied to the centrifugal disk 12a, which is part of the spreader 10 and which faces away from the field-internal spreading boundary G, during traveling through the first close range I and the second close range II, corresponds to the reduction amount of granular material MM applied less to the centrifugal disk 12b, which is part of the spreader 10 and which faces the field-internal spreading boundary G, during traveling through the first close range I and the second close range II. The further amount of granular material MZ corresponds to the difference in quantity between the amount of granular material actually applied to the centrifugal disk 12a, which is part of the spreader 10 and which faces away from the field-internal spreading boundary G, during traveling through the first close range I and the second close range II, and a theoretical amount of granular material that would have been applied to the centrifugal disk 12a, which is part of the spreader 10 and which faces away from the field-internal spreading boundary G, if the amount of granular material applied to the centrifugal disk 12a, which is part of the spreader 10 and which faces away from the field-internal spreading boundary G, had neither been increased in the first close range I nor reduced in the second close range II, but had been kept constant during traveling through the first close range I and the second close range II. The reduction amount of granular material MM corresponds to the difference in quantity between the granular material actually applied to the centrifugal disk 12b, which is part of the spreader 10 and which faces the field-internal spreading boundary G, during traveling through the first close range I and the second close range II, and a theoretical amount of granular material that would have been applied to the centrifugal disk 12b, which is part of the spreader 10 and which faces the field-internal spreading boundary G, if the amount of granular material applied to the centrifugal disk 12b, which is part of the spreader 10 and which faces the field-internal spreading boundary G, had been continuously and uniformly reduced to zero during traveling through the first close range I and the second close range II.

The second range II close to the field-internal spreading boundary G extends from the second distance A2 between the spreader 10 and the field-internal spreading boundary G up to a third distance A3 between the spreader 10 and the field-internal spreading boundary G.

In addition, during traveling through the second range II close to the field-internal spreading boundary G, the rotational speed n2 of the centrifugal disk 12b, which is part of the spreader 10 and which faces the field-internal spreading boundary G, is re-increased to the normal speed n0, while the rotational speed n1 of the centrifugal disk 12b, which is part of the spreader 10 and which faces away from the field-internal spreading boundary G, is kept constant. The application points P1, P2 of the granular material applied to the centrifugal disks 12a, 12b of the spreader 10 remain unchanged during traveling through the second close range II.

Figure 3:
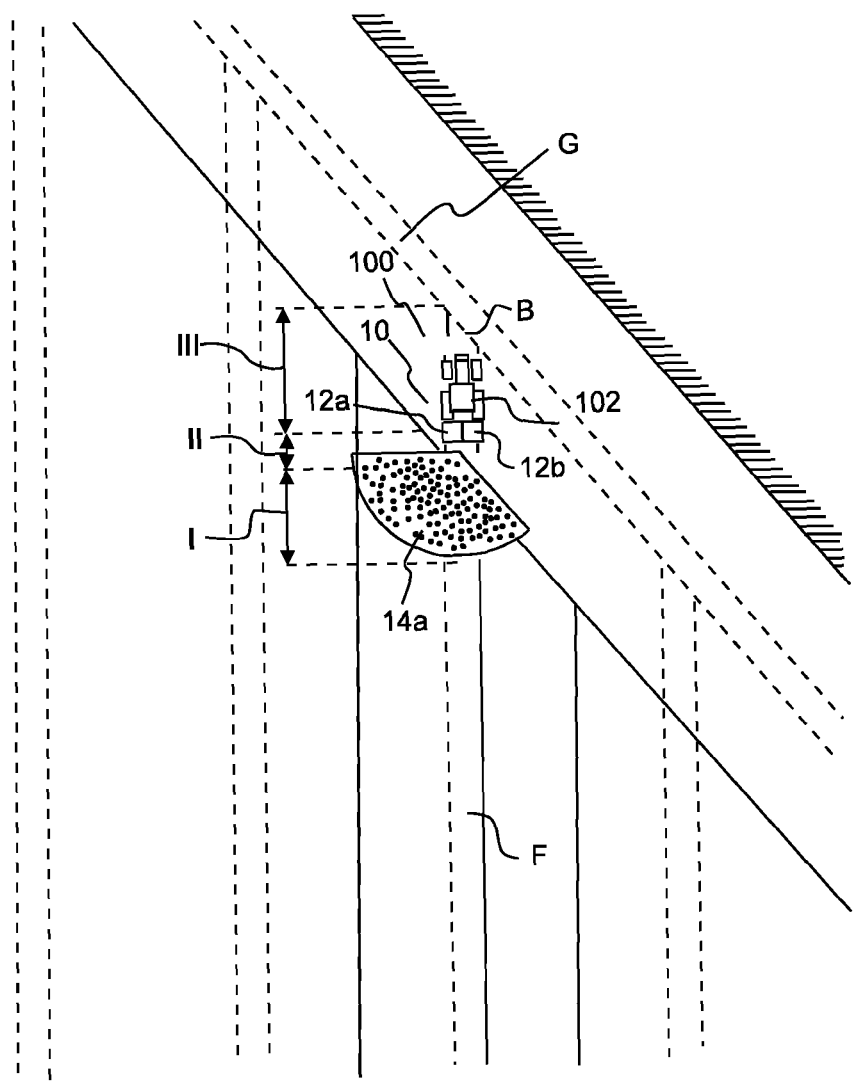

In FIG. 3, the spreader 10 is located directly in front of a third close range III, which adjoins the second range II close to the field-internal spreading boundary G. In conjunction with FIG. 5, it can be seen that the amount M1 of granular material applied to the centrifugal disk 12a, which is part of the spreader 10 and which faces away from the field-internal spreading boundary G, is reduced to zero during traveling through a third range III close to the field-internal spreading boundary G. During traveling through a third range III close to the field-internal spreading boundary G, the centrifugal disk 12b, which is part of the spreader 10 and which faces the field-internal spreading boundary G, does not have applied thereto any granular material.

The third range III close to the field-internal spreading boundary G extends from the third distance A3 between the spreader 10 and the field-internal spreading boundary G up to the field-internal spreading boundary G.

Figure 4:
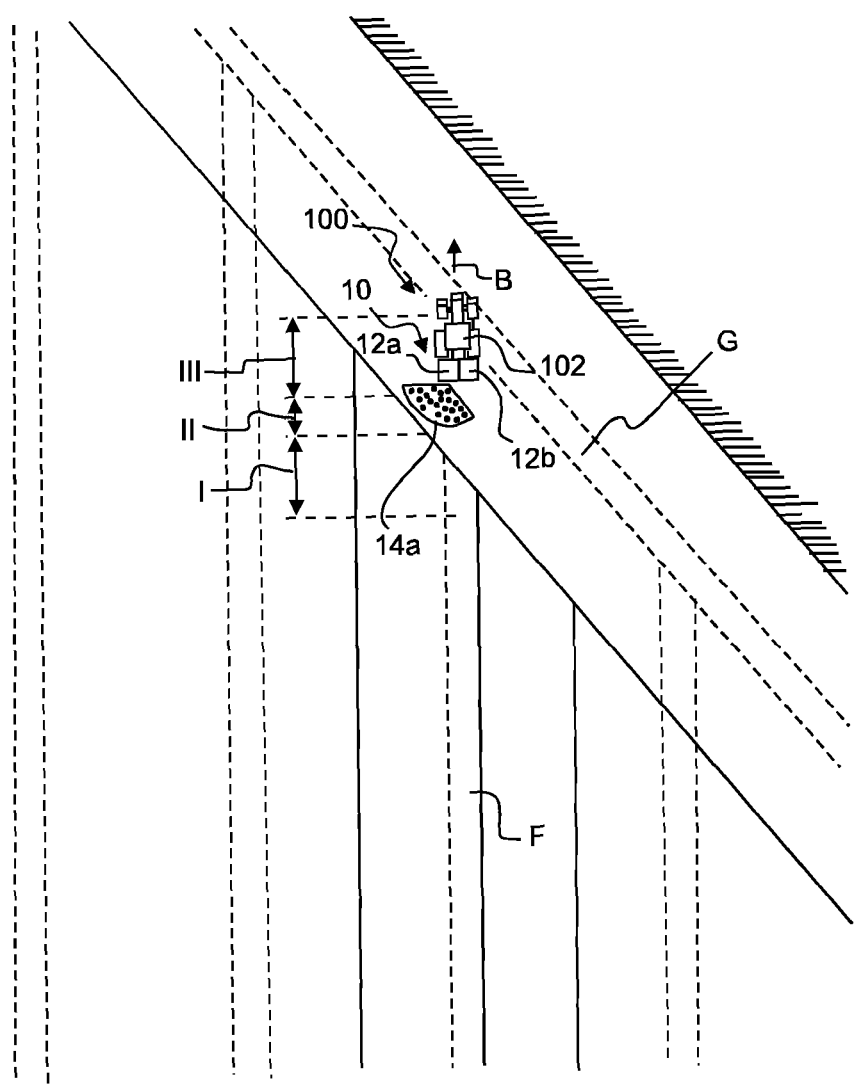

In FIG. 4, the spreader 10 is located in the third close range III. In conjunction with FIG. 5, it can be seen that, during traveling through the third range III close to the field-internal spreading boundary G, the application point P1 of the granular material applied to the centrifugal disk 12a, which is part of the spreader 10 and which faces away from the field-internal spreading boundary G, is changed such that the spreading pattern 14a of the centrifugal disk 12a facing away from the field-internal spreading boundary G is turned away from the spreading boundary G. The application point P2 of the granular material applied to the centrifugal disk 12b, which is part of the spreader 10 and which faces the field-internal spreading boundary G, remains unchanged during traveling through the third range III close to the field-internal spreading boundary G.

The rotational speed n1 of the centrifugal disk 12a, which is part of the spreader 10 and which faces away from the field-internal spreading boundary G, is re-increased to the normal speed n0 during traveling through the third range III close to the field-internal spreading boundary G, and thus adapted to the rotational speed n2 of the centrifugal disk 12b, which is part of the spreader 10 and which faces the field-internal spreading boundary G.

LIST OF REFERENCE NUMERALS 10 spreader
12a, 12b centrifugal disks
14a, 14b spreading patterns
100 spreading combination
102 vehicle
I-III close ranges
G spreading boundary
M0 normal amount
M1, M2 amount of granular material
MZ further amount of granular material
MM reduction amount of granular material
A1-A3 distances
P0 application point during normal operation
P1, P2 application points
n0 normal speed
n1, n2 rotational speeds
B direction of movement
F tramline

The invention claimed is:

1. A method of spreading granular material by a spreader with first and second rotatingly drivable centrifugal disks arranged side by side, the method comprising the steps of:
detecting a field-internal spreading boundary, which extends ahead of the spreader in a direction of movement of the spreader and which necessitates an adaptation of distribution characteristics of the spreader during traveling on at least one tramline;
reducing an amount of granular material applied to the second centrifugal disk, which is part of the spreader and which faces the field-internal spreading boundary, during traveling through a first range proximate to the field-internal spreading boundary;
increasing the amount of granular material applied to the first centrifugal disk, which is part of the spreader and which faces away from the field-internal spreading boundary, during traveling through the first range proximate to the field-internal spreading boundary; and
reducing the amount of granular material applied to the first centrifugal disk, which is part of the spreader and which faces away from the field-internal spreading boundary, during traveling through a second range proximate to the field-internal spreading boundary, the second range adjoining the first range proximate to the field-internal spreading boundary,
wherein a percentage by which the amount of granular material applied to the first centrifugal disk, which is part of the spreader and which faces away from the field-internal spreading boundary, during traveling through the second range proximate to the field-internal spreading boundary, is reduced corresponds to a percentage by which the amount of granular material that has been applied to the first centrifugal disk, which is part of the spreader and which faces away from the field-internal spreading boundary, during traveling through the first range proximate to the field-internal spreading boundary, has been increased.

2. The method according to claim 1, further comprising the step of:
reducing the amount of granular material applied to the second centrifugal disk, which is part of the spreader and which faces the field-internal spreading boundary, during traveling through a second range proximate to the field-internal spreading boundary, the second range adjoining the first range close to proximate to the field-internal spreading boundary,
wherein the amount of granular material applied to the second centrifugal disk, which is part of the spreader and which faces the field-internal spreading boundary, is reduced to zero during traveling through the second range proximate to the field-internal spreading boundary.

3. The method according to claim 1, wherein the total amount of granular material applied to the first centrifugal disk, which is part of the spreader and which faces away from the field-internal spreading boundary, and to the second centrifugal disk, which is part of the spreader and which faces the field-internal spreading boundary, while traveling through the first range and the second range, corresponds to a usual total amount of granular material for this area.

4. The method according to claim 3, wherein a further amount of granular material additionally applied to the first centrifugal disk, which is part of the spreader and which faces away from the field-internal spreading boundary, during traveling through the first range and the second range corresponds to a reduced amount of granular material applied to the second centrifugal disk, which is part of the spreader and which faces the field-internal spreading boundary, during traveling through the first range and the second range.

5. The method according to claim 1, further comprising the step of:
reducing the amount of granular material applied to the first centrifugal disk, which is part of the spreader and which faces away from the field-internal spreading boundary, during traveling through a third range proximate to the field-internal spreading boundary, the third range adjoining the second range proximate to the field-internal spreading boundary,
wherein the amount of granular material applied to the first centrifugal disk, which is part of the spreader and which faces away from the field-internal spreading boundary, is reduced to zero during traveling through the third range proximate to the field-internal spreading boundary.

6. The method according to claim 1, further comprising the step of:
changing an application point of the granular material applied to the first centrifugal disk, which is part of the spreader and which faces away from the field-internal spreading boundary, during traveling through the third range proximate to the field-internal spreading boundary.

7. The method according to claim 6, wherein changing the application point of the granular material applied to the first centrifugal disk, which is part of the spreader and which faces away from the field-internal spreading boundary, comprises at least one of the steps of:
changing a relative position or a relative orientation of the first centrifugal disk facing away from the field-internal spreading boundary and of a dosing unit assigned to the first centrifugal disk facing away from the field-internal spreading boundary, or
moving the first centrifugal disk, which faces away from the field-internal spreading boundary, or
moving a dosing unit assigned to the first centrifugal disk, which faces away from the field-internal spreading boundary.

8. The method according to claim 6, wherein changing the application point of the granular material applied to the first centrifugal disk, which is part of the spreader and which faces away from the field-internal spreading boundary, takes place such that a spreading pattern of the first centrifugal disk facing away from the field-internal spreading boundary is turned away from the spreading boundary.

9. A spreader for spreading granular material, comprising:
first and second rotatingly drivable centrifugal disks arranged side by side,
wherein the spreader is configured to:
detect a field-internal spreading boundary, which extends ahead of the spreader in a direction of movement of the spreader and which necessitates an adaptation of distribution characteristics of the spreader during traveling on at least one tramline;
reduce an amount of granular material applied to the second centrifugal disk, which is part of the spreader and which faces the field-internal spreading boundary, during traveling through a first range proximate to the field-internal spreading boundary;
increase the amount of granular material applied to the first centrifugal disk, which is part of the spreader and which faces away from the field-internal spreading boundary, during traveling through the first range proximate to the field-internal spreading boundary; and
reduce the amount of granular material applied to the first centrifugal disk, which is part of the spreader and which faces away from the field-internal spreading boundary, during traveling through a second range proximate to the field-internal spreading boundary, the second range adjoining the first range proximate to the field-internal spreading boundary,
wherein a percentage by which the amount of granular material applied to the first centrifugal disk, which is part of the spreader and which faces away from the field-internal spreading boundary, during traveling through the second range proximate to the field-internal spreading boundary, is reduced corresponds to a percentage by which the amount of granular material that has been applied to the first centrifugal disk, which is part of the spreader and which faces away from the field-internal spreading boundary, during traveling through the first range proximate to the field-internal spreading boundary, has been increased.

10. A spreading system, comprising:
a spreader for spreading granular material; and
a vehicle pulling or carrying the spreader,
wherein the spreading system is configured to:
detect a field-internal spreading boundary, which extends ahead of the spreader in a direction of movement of the spreader and which necessitates an adaptation of distribution characteristics of the spreader during traveling on at least one tramline;
reduce an amount of granular material applied to the second centrifugal disk, which is part of the spreader and which faces the field-internal spreading boundary, during traveling through a first range proximate to the field-internal spreading boundary;
increase the amount of granular material applied to the first centrifugal disk, which is part of the spreader and which faces away from the field-internal spreading boundary, during traveling through the first range proximate to the field-internal spreading boundary; and
reduce the amount of granular material applied to the first centrifugal disk, which is part of the spreader and which faces away from the field-internal spreading boundary, during traveling through a second range proximate to the field-internal spreading boundary, the second range adjoining the first range proximate to the field-internal spreading boundary,
wherein a percentage by which the amount of granular material applied to the first centrifugal disk, which is part of the spreader and which faces away from the through the second range proximate to the field-internal spreading boundary, is reduced corresponds to a percentage by which the amount of granular material that has been applied to the first centrifugal disk, which is part of the spreader and which faces away from the field-internal spreading boundary, during traveling through the first range proximate to the field-internal spreading boundary, has been increased.

11. The spreading system of claim 10, wherein the spreader is a fertilizer spreader.

12. The spreading system of claim 10, wherein the vehicle is a tractor.

* * * * *